United States Patent
Bent et al.

(10) Patent No.: US 10,375,164 B1
(45) Date of Patent: Aug. 6, 2019

(54) PARALLEL STORAGE SYSTEM WITH BURST BUFFER APPLIANCE FOR STORAGE OF PARTITIONED KEY-VALUE STORE ACROSS A PLURALITY OF STORAGE TIERS

(71) Applicant: EMC Corporation, Hopkinton, MA (US)

(72) Inventors: John M. Bent, Los Alamos, NM (US); Sorin Faibish, Newton, MA (US); Gary Grider, Los Alamos, NM (US); Aaron Torres, Los Alamos, NM (US); Stephen W. Poole, Knoxville, TN (US)

(73) Assignees: EMC Corporation, Hopkinton, MA (US); Triad National Security, LLC, Los Alamos, NM (US); UT-Battelle, LLC, Oak Ridge, TN (US)

( * ) Notice: Subject to any disclaimer, the term of this patent is extended or adjusted under 35 U.S.C. 154(b) by 728 days.

(21) Appl. No.: 14/143,749

(22) Filed: Dec. 30, 2013

(51) Int. Cl.
   *G06F 17/30* (2006.01)
   *H04L 29/08* (2006.01)
   *G06F 9/50* (2006.01)

(52) U.S. Cl.
   CPC ........ *H04L 67/1097* (2013.01); *G06F 9/5077* (2013.01)

(58) Field of Classification Search
   CPC ............. G06F 15/17331; G06F 9/5077; H04L 67/289; H04L 67/2842; H04L 67/2861
   USPC ....................................................... 709/213
   See application file for complete search history.

(56) References Cited

U.S. PATENT DOCUMENTS

| | | | |
|---|---|---|---|
| 9,235,609 B1* | 1/2016 | Pandey | G06F 17/30309 |
| 2013/0227194 A1 | 8/2013 | Kannan et al. | |
| 2014/0047062 A1* | 2/2014 | Krueger | H04L 67/2842 |
| | | | 709/216 |
| 2014/0108707 A1* | 4/2014 | Nowoczynski | G06F 12/0246 |
| | | | 711/103 |
| 2014/0351300 A1 | 11/2014 | Uppu et al. | |

OTHER PUBLICATIONS

"Performance Evaluation of Range Queries in Key Value Stores", Pirzadeh et al., 2011 IEEE Internation Parallel & Distributed Processing Symposium, pp. 1092-1101.*

(Continued)

*Primary Examiner* — Douglas B Blair
*Assistant Examiner* — Jonathan A Sparks
(74) *Attorney, Agent, or Firm* — Ryan, Mason & Lewis, LLP (57) ABSTRACT

Parallel storage systems are provided with a burst buffer appliance for storage of a partitioned key-value store across a plurality of storage tiers. The burst buffer appliance is configured to store key-value data on first and second storage tiers comprising respective disjoint subsets of storage. One or more servers in the partitioned key-value store provide (i) an interface between one or more local key-value stores and one or more additional storage architectures, and/or (ii) a key value interface that provides access to at least one hardware key-value store. The local key-values are optionally sorted both locally by the local store and globally by the overall MDHIM framework. The local and global sorting can be leveraged to provide batch input/output (IO) operations that aggregate multiple requests into batch operations on one or more sorted ranges.

24 Claims, 7 Drawing Sheets

(56) References Cited

OTHER PUBLICATIONS

"Multi-Dimensional Hashed Indexed Metadata/Middleware (MDHIM) Project", by James Nunez, Ultrascale Systems Research Center, High Performance Computing Systems Integration, May 10, 2012. (Year: 2012).*

* cited by examiner

PARALLEL STORAGE SYSTEM WITH BURST BUFFER APPLIANCE FOR STORAGE OF PARTITIONED KEY-VALUE STORE ACROSS A PLURALITY OF STORAGE TIERS

STATEMENT OF GOVERNMENT RIGHTS

The United States government has rights in this invention pursuant to Contract No. DE-AC52-06NA25396 between the United States Department of Energy and Los Alamos National Security and pursuant to Contract No. De-AC05-00OR22725 between the United States Department of Energy and UT-Battelle, LLC.

CROSS-REFERENCE TO RELATED APPLICATIONS

The present application is related to U.S. patent application Ser. No. 14/143,758, entitled "Partitioned Key-Value Store With One-Sided Communications for Secondary Global Key Lookup by Range-Knowledgeable Clients," and U.S. patent application Ser. No. 14/143,771, (now U.S. Pat. No. 7,516,131) entitled "Parallel Sort With a Ranged, Partitioned Key-Value Store in a High Performance Computing Environment," each filed contemporaneously herewith and incorporated by reference herein.

FIELD

The field relates generally to data storage, and more particularly to partitioned key-value stores.

BACKGROUND

Key-value stores are a powerful tool to store and retrieve large amounts of data for activities such as data analysis. One difficulty in creating these key-value stores is the need for parallelism. The large amount of data that must be stored makes a key-value store on a single node impractical for most workloads. Thus, distributed key-value stores have been proposed for storing a partitioned key-value store (often referred to as a partitioned data store) on a number of parallel nodes.

Multidimensional Data Hashing Indexing Middleware (MDHIM) is an example of a framework for partitioned data stores. In a typical MDHIM implementation, one or more MDHIM clients run on each of the compute nodes and communicate with a plurality of MDHIM servers also running on the same or different compute nodes in a parallel file system. Each MDHIM server stores a partition of the key-value store. A given MDHIM server storing a particular sub-range of the key-value store is contacted to read or write key-values within the sub-range.

One challenge in a partitioned key-value store is the amount of key-value data that must be transferred, stored and processed. Thus, MDHIM employs low-latency Message Passing Interface (MPI) communications across the user-space of high performance computing (HPC) compute nodes to create a single virtual key-value store across a set of local key-value stores using ordered key-ranges.

While MDHIM has significantly improved the performance of partitioned data stores in an HPC environment, a need remains for multi-tiered storage of partitioned data stores.

SUMMARY

Illustrative embodiments of the present invention provide parallel storage systems with a burst buffer appliance for storage of a partitioned key-value store across a plurality of storage tiers. In one embodiment, a burst buffer appliance is provided in a partitioned key-value store. The burst buffer appliance is configured to store key-value data on first and second storage tiers comprising respective disjoint subsets of storage.

According to another aspect of the invention, one or more servers in the disclosed partitioned key-value store provide an interface between one or more local key-value stores and one or more additional storage architectures. In addition, one or more servers in the disclosed partitioned key-value store optionally provide a key value interface that provides access to at least one hardware key-value store.

According to a further aspect of the invention, the local key-values are optionally sorted both locally by the local store and globally by the overall MDHIM framework. Another aspect of the invention leverages the local and global sorting to provide batch input/output (IO) operations that aggregate multiple requests into batch operations on one or more sorted ranges.

As noted above, illustrative embodiments described herein provide significant improvements relative to conventional arrangements. In some of these embodiments, use of a flash storage tier in conjunction with a disk storage tier allows dynamic balancing of storage capacity and IO throughput requirements in a partitioned key-value store, thereby allowing particular levels of performance to be achieved at a significantly lower cost than would otherwise be possible. Similar improvements are provided using other numbers and types of storage tiers, with migration between the tiers being controlled by one or more burst buffers of the cluster file system.

DETAILED DESCRIPTION

Illustrative embodiments of the present invention will be described herein with reference to exemplary partitioned data stores and associated clients, servers, storage arrays and other processing devices. It is to be appreciated, however, that the invention is not restricted to use with the particular illustrative partitioned data stores and device configurations shown. Accordingly, the terms "partitioned data store" and "partitioned key-value store" as used herein are intended to be broadly construed.

Aspects of the present invention provide parallel storage systems with a burst buffer appliance for storage of a partitioned key-value store across a plurality of storage tiers. While the exemplary embodiments of the present invention employ MDHIM, other MPI-Linked partitioned data stores can be employed, as would be apparent to a person of ordinary skill in the art.

According to one aspect of the invention, a burst buffer appliance is provided in a partitioned key-value store. As discussed further below, the burst buffer appliance is configured to store key-value data on first and second storage tiers comprising respective disjoint subsets of storage. In this manner, the burst buffer appliance provides access to an expanded storage footprint, including multi-tier key-value storage.

According to another aspect of the invention, one or more servers in the disclosed partitioned key-value store provide an interface between one or more local key-value stores and one or more additional storage architectures. In addition, one or more servers in the disclosed partitioned key-value store optionally provide a key value interface that provides access to at least one hardware key-value store.

According to a further aspect of the invention, the local key-values are optionally sorted both locally by the local store and globally by the overall MDHIM framework. Another aspect of the invention leverages the local and global sorting to provide batch input/output (IO) operations that aggregate multiple requests into batch operations on one or more sorted ranges. In this manner, desired data can be obtained using a reduced number of messages over the network.

Figure 1:
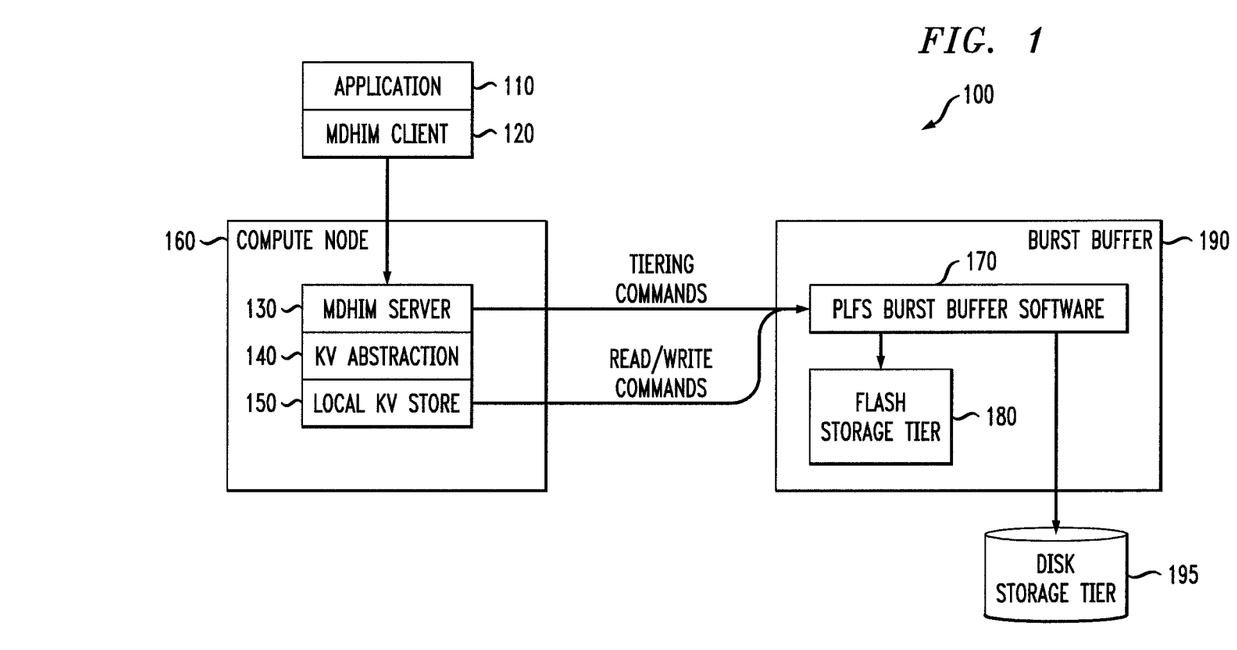
FIG. 1 illustrates an exemplary partitioned key-value store incorporating aspects of the invention.

FIG. 1 illustrates an exemplary partitioned key-value store 100 incorporating aspects of the invention. As shown in FIG. 1, the exemplary partitioned key-value store 100 comprises an exemplary application, such as application 110, that can read, write and/or query key-value data in the exemplary partitioned key-value store 100, using one or more MDHIM clients, such as the exemplary MDHIM client 120. One or more MDHIM servers, such as MDHIM server 130, control the storage of key-value data using a key-value abstraction layer 140 and a local key-value store 150 on a compute node 160 in a high performance computing (HPC) environment, in a known manner. Generally, the local key-value store 150 processes key-value operations such as leveldb or pblisam.

An exemplary architecture for an MDHIM partitioned key-value store is discussed further below in conjunction with FIG. 3. For a more detailed discussion of MDHIM, see, for example, James Nunez et al., "Multidimensional Data Hashing Indexing Metadata/Middleware (MDHIM) Project," Ultrascale Systems Research Center, High Performance Computing Systems Integration (2012-2013), incorporated by reference herein.

As indicated above, one aspect of the invention provides a burst buffer appliance 190 in the partitioned key-value store 100. As discussed further below, the burst buffer appliance is configured to store key-value data on first and second storage tiers comprising respective disjoint subsets of storage. In this manner, the burst buffer appliance provides access to an expanded storage footprint, including multi-tier key-value storage.

As shown in FIG. 1, the exemplary burst buffer appliance 190 comprises parallel log structured file system (PLFS) burst buffer software 170 that provides access to an exemplary flash storage tier 180 and an exemplary disk storage tier 195. The exemplary flash storage tier 180 may be integrated within the burst buffer appliance 190 or an external storage device. The parallel log structured file system (PLFS) may be based on, for example, John Bent et al., "PLFS: A Checkpoint Filesystem for Parallel Applications," Int'l Conf. for High Performance Computing, Networking, Storage and Analysis 2009 (SC09) (November 2009), incorporated by reference herein.

As shown in FIG. 1, the exemplary burst buffer appliance 190 is configured to process tiering commands from the MDHIM server 130 on compute node 160, as well as read and write commands from the local key value store 150 on compute node 160.

The burst buffer appliance 190 is configured to communicate with clients, object storage servers and MDHIM servers 130 over a network. The burst buffer appliance 190 in the present embodiment is assumed to comprise a flash memory or other high-speed memory having a substantially lower access time than the disk storage tier 195. The burst buffer appliance 190 may optionally comprise an analytics engine, and may include other components.

Although flash memory will often be used for the high-speed memory of the burst buffer appliance 190, other types of low-latency memory could be used instead of flash memory. Typically, such low-latency memories comprise electronic memories, which may be implemented using non-volatile memories, volatile memories or combinations of non-volatile and volatile memories. Accordingly, the term "burst buffer appliance" as used herein is intended to be broadly construed, so as to encompass any network appliance or other arrangement of hardware and associated software or firmware that collectively provides a high-speed memory and optionally an analytics engine to control access to the high-speed memory. Thus, such an appliance includes a high-speed memory that may be viewed as serving as a buffer between a computer system comprising clients executing on compute nodes (not shown) and a file system such as storage tiers 180, 195, for storing bursts of data associated with different types of IO operations.

The burst buffer appliance 190 further comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination.

The memory and other memories disclosed herein may be viewed as examples of what are more generally referred to as "computer program products" storing executable computer program code.

Also included in the burst buffer appliance is network interface circuitry. The network interface circuitry allows the burst buffer appliance to communicate over the network with other devices. The network interface circuitry may comprise, for example, one or more conventional transceivers.

The storage tiering functionality of the burst buffer appliance 190 may be implemented at least in part in the form of software that is stored in memory and executed by a processor.

The burst buffer appliance 190 comprising processor, memory and network interface components as described above is an example of what is more generally referred to herein as a "processing device." Each of the devices herein may similarly be implemented as a processing device comprising processor, memory and network interface components.

Although only a single burst buffer appliance 190 is shown in the FIG. 1 embodiment, a given partitioned key-value store in other embodiments may comprise multiple burst buffer appliances 190.

The exemplary flash storage tier 180 and exemplary disk storage tier 195 in the present embodiment are arranged into first and second storage tiers, also denoted as Storage Tier 1 and Storage Tier 2, although it is to be appreciated that more than two storage tiers may be used in other embodiments. Each of the exemplary flash storage tier 180 and exemplary disk storage tier 195 may be viewed as being representative of an object storage target of a corresponding object storage server. The first and second storage tiers comprise respective disjoint subsets of the object storage servers.

The different storage tiers 180 and 195 in this embodiment comprise different types of storage devices having different performance characteristics. The flash storage devices of the storage tier 180 are generally significantly faster in terms of read and write access times than the disk storage devices of the storage tier 195. The flash storage devices are therefore considered "fast" devices in this embodiment relative to the "slow" disk storage devices. Accordingly, the exemplary partitioned key-value store 100 may be characterized in the present embodiment as having a "fast" storage tier 180 and a "slow" storage tier 195, where "fast" and "slow" in this context are relative terms and not intended to denote any particular absolute performance level. These storage tiers comprise respective disjoint subsets of object storage servers and their associated object storage targets. However, numerous alternative tiering arrangements may be used, including three or more tiers each providing a different level of performance. The particular storage devices used in a given storage tier may be varied in other embodiments and multiple distinct storage device types may be used within a single storage tier.

The flash storage devices in the exemplary flash storage tier 180 may be implemented, by way of example, using respective flash Peripheral Component Interconnect Express (PCIe) cards or other types of memory cards installed in a computer or other processing device that implements the corresponding object storage server 104. Numerous alternative arrangements are possible. Also, a variety of other types of non-volatile or volatile memory in any combination may be used to implement at least a portion of the storage devices 105. Examples of alternatives to flash storage devices that may be used as respective object storage targets in other embodiments of the invention include non-volatile memories such as magnetic random access memory (MRAM) and phase change random access memory (PC-RAM).

The flash storage devices of the exemplary flash storage tier 180 generally provide higher performance than the disk storage devices but the disk storage devices of the disk storage tier 195 generally provide higher capacity at lower cost than the flash storage devices. The exemplary tiering arrangement of FIG. 1 therefore makes it possible to dynamically balance the conflicting requirements of storage capacity and IO throughput, thereby avoiding situations in which either performance is less than optimal or the costs of implementing the system become excessive. Arrangements of this type can provide further acceleration of IO operations in the exemplary partitioned key-value store 100, leading to enhanced system performance relative to conventional arrangements, while additionally or alternatively providing an ability to achieve particular levels of performance at lower cost.

The embodiment of FIG. 1 provides an MDHIM partitioned key-value store with tiered storage where the MDHIM server 130 executes on a compute node 160. The exemplary MDHIM server 130 can be implemented in a conventional manner, and be unaware of tiering provided by the burst buffer appliance 190 and transparently benefit from the improved performance. In another variation, the MDHIM server 130 can be burst buffer aware and interface to the application programming interface (API) of the burst buffer appliance 190 to help make intelligent tiering decisions using one or more tiering commands, as shown in FIG. 1.

Figure 2:
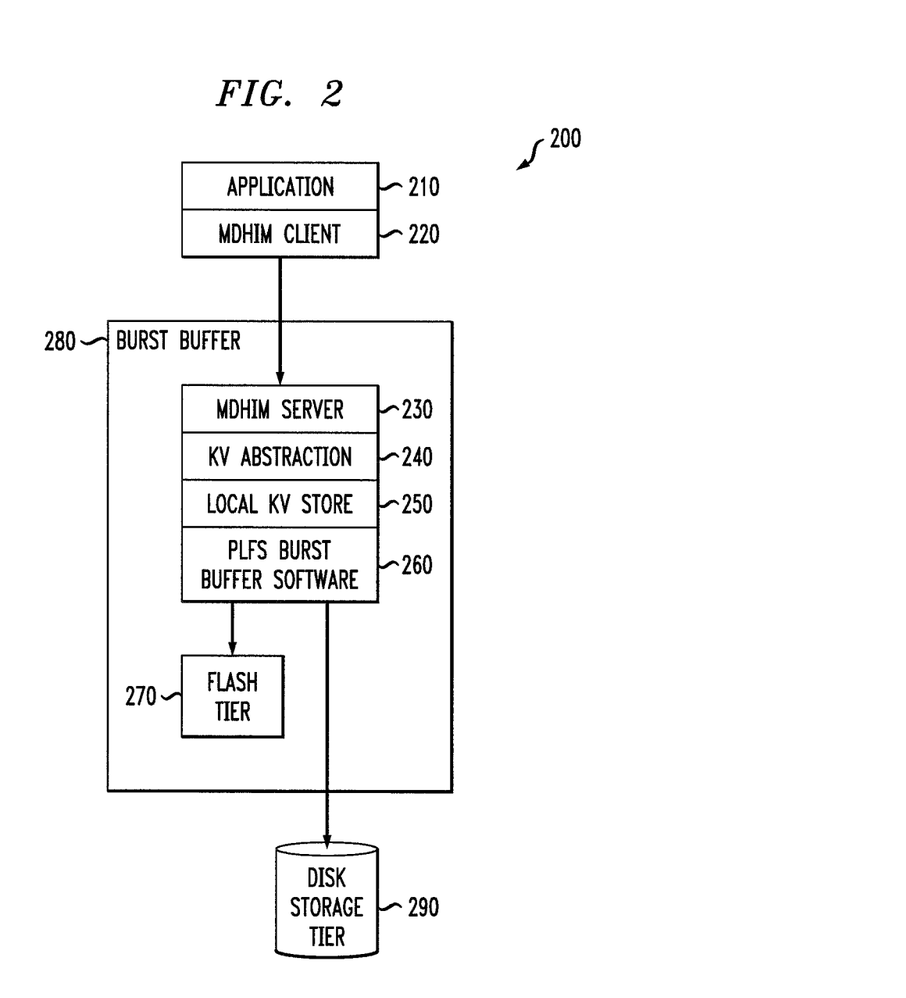
FIG. 2 illustrates an exemplary alternate partitioned key-value store incorporating aspects of the invention.

FIG. 2 illustrates an exemplary alternate partitioned key-value store 200 incorporating aspects of the invention. Generally, in the embodiment of FIG. 2, the MDHIM server 230 executes on the burst buffer appliance 280. In this manner, MDHIM can be implemented in a high performance computing (HPC) environment in which the compute nodes 160 do not provide storage. In addition, when the MDHIM servers 230 execute on the burst buffer appliance 280, processing resources on the compute nodes 160 are not consumed by the MDHIM servers 230.

As shown in FIG. 2, the exemplary partitioned key-value store 200 comprises an exemplary application, such as application 210, that can read, write and/or query key-value data in the exemplary partitioned key-value store 200, using one or more MDHIM clients, such as the exemplary MDHIM client 220, in a similar manner to FIG. 1. One or more MDHIM servers, such as MDHIM server 230 executing on the burst buffer appliance 280, control the storage of key-value data using a key-value abstraction layer 240 and a local key-value store 250.

The exemplary burst buffer appliance 280 further comprises the PLFS burst buffer software 260 that provides access to an exemplary flash storage tier 270 and an exemplary disk storage tier 290, in a similar manner to FIG. 1. The exemplary flash storage tier 270 may be integrated within the burst buffer appliance 280, as shown in FIG. 2, or an external storage device.

Figure 3:
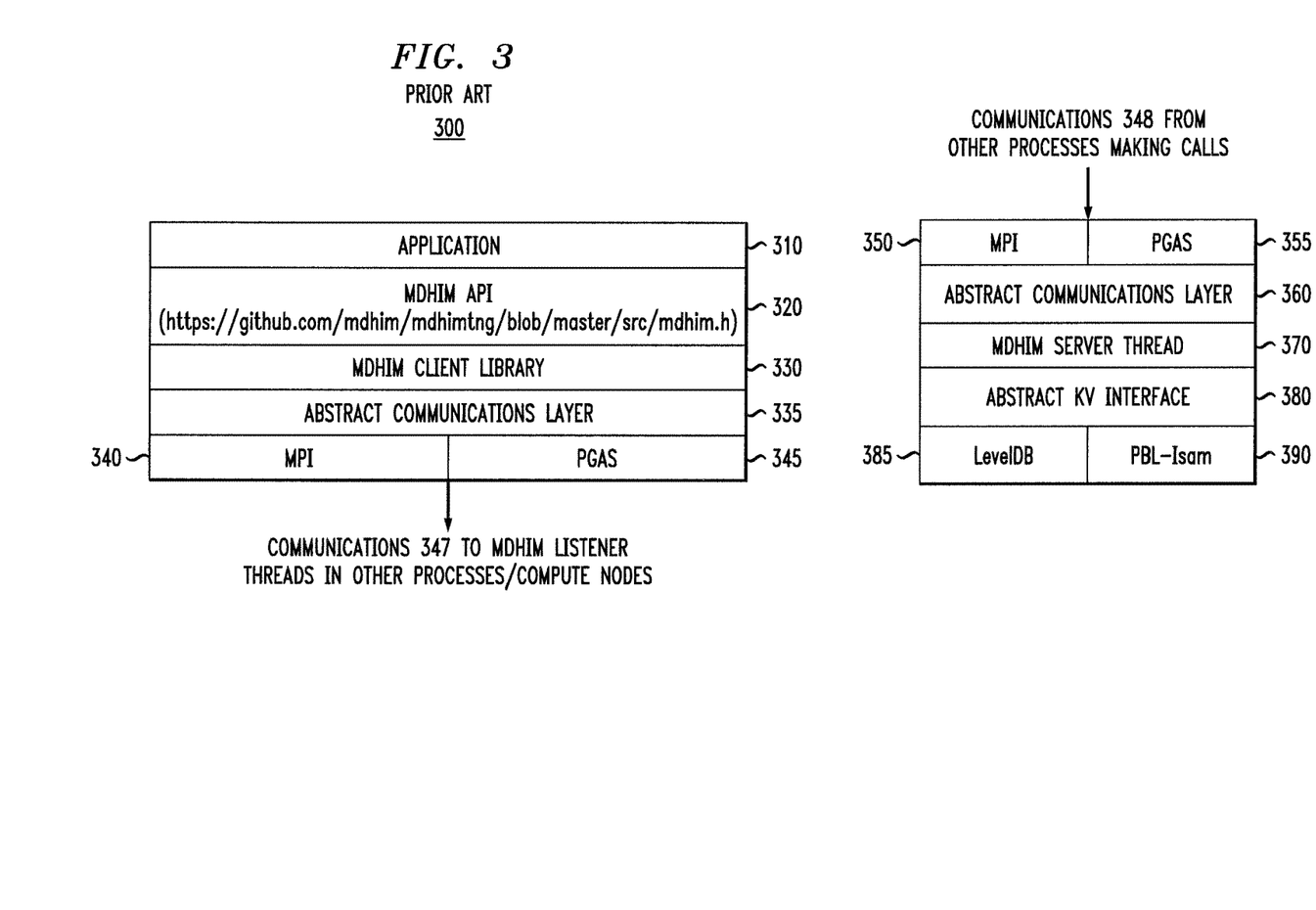
FIG. 3 illustrates an exemplary conventional architecture and application programming interface (API) for an MDHIM partitioned key-value store.

FIG. 3 illustrates an exemplary conventional architecture and application programming interface (API) for an MDHIM partitioned key-value store. Generally, an MDHIM framework employs one process address space, with the original process and the MDHIM listener thread in the same process space after the call to mdhim_init( ) which caused the MDHIM listener thread to be spawned. Users run an MPI job and call mdhim_init( ) on every process/thread/MPI rank/compute node where an MDHIM server is desired.

MDHIM then spawns a listener thread to receive MDHIM communications 348 from other processes making calls to mdhim such as mdhim_get or mdhim_put. As discussed further below, subsequent calls to mdhim (such as mdhim_put or mdhim_get) then create an MPI unexpected message which is sent to one of the MDHIM servers. MDHIM can run as client/server where each compute node is running both an MDHIM client and an MDHIM server.

MDHIM communications 348 from other processes are processed in a first layer comprising the Message Passing Interface (MPI) 350 or PGAS 355, followed by an abstract communications layer 360, MDHIM Server Thread 370, abstract key-value interface 380 and key-value operations such as leveldb 385 and Pbl-Isam 390, in a known manner.

Communications 347 to MDHIM Listener threads running in other processes/compute nodes are generated by an application 310 that provides messages to an MDHIM application programming interface (API) 320 using an MDHIM client library 330 and an abstract communications layer 335. Communications 347 are sent to other processes using the Message Passing Interface (MPI) 340 or PGAS 345.

The MDHIM application programming interface (API) 320 comprises the following exemplary operations:
- MDHIM init—initializes MDHIM structures and creates range server threads.
- MDHIM_PUT—put one or more keys in a data store
- MDHIM_GET—get one or more keys from the data store
- MDHIM insert—a list function that inserts new records with key and record data
- MDHIM flush—makes key distribution information available to MDHIM clients
- MDHIM find—find a record using primary key (match, best higher or lower) and set the absolute record number.
- MDHIM close—close an MDHIM file
- MDHIM read—a list function that read records (key and data), using absolute record numbers For a more detailed discussion of MDHIM, see, for example, James Nunez et al., "Multidimensional Data Hashing Indexing Metadata/Middleware (MDHIM) Project," Ultrascale Systems Research Center, High Performance Computing Systems Integration (2012-2013), incorporated by reference herein.

As previously indicated, an aspect of the invention sorts the local key-values locally by the local store and globally by the overall MDHIM framework. The local and global sorting can be leveraged to provide batch input/output (IO) operations that aggregate multiple requests into batch operations on one or more sorted ranges. In this manner, desired data can be obtained using a reduced number of messages over the network. For a more detailed discussion of key sorting techniques, see, for example, U.S. patent application Ser. No. 14/143,758, entitled "Partitioned Key-Value Store With One-Sided Communications for Secondary Global Key Lookup by Range-Knowledgeable Clients," filed contemporaneously herewith and incorporated by reference herein.

Aspects of the present invention thus recognize that HPC applications typically will access contiguous sets of keys in parallel. Therefore, one process in an HPC job will access one sorted range and another will access a different sorted range. The global sort allows a better storage access pattern where each process only queries from a small set of the range server nodes. In addition, the local sort allows individual key requests to result in fewer storage operations.

Figure 4:
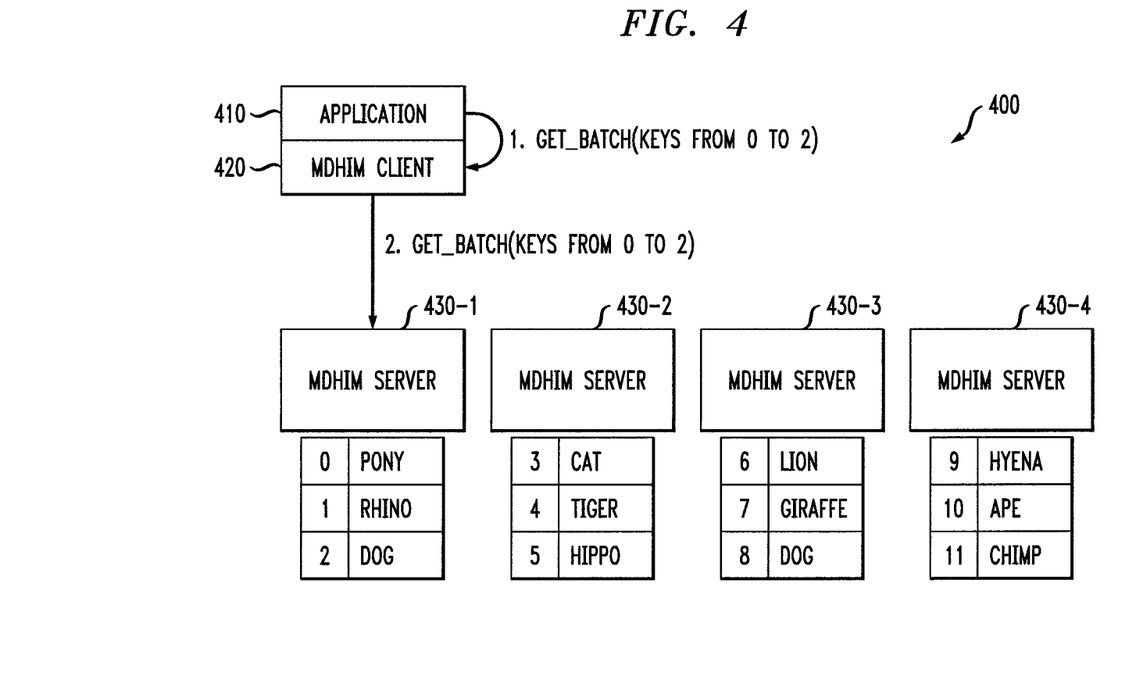
FIG. 4 illustrates the processing of a batch operation in an exemplary partitioned key-value store incorporating global sorting aspects of the invention.

FIG. 4 illustrates the processing of a batch operation in an exemplary partitioned key-value store 400 incorporating global sorting aspects of the invention. As shown in FIG. 4, the exemplary partitioned key-value store 400 comprises an exemplary application 410 that can read, write and/or query key-value data in the exemplary partitioned key-value store 400, using one or more MDHIM clients, such as the exemplary MDHIM client 420. One or more MDHIM servers 430-1 through 430-N (N is equal to 4 in the exemplary embodiment of FIG. 4) control the storage of key-value data.

The exemplary application 410 initially issues an aggregated "get batch" request to the client 420 during a first step, as follows:
　get_batch(keys from 0 to 2)

A flush command optionally gives the MDHIM client 420 knowledge about the statistics of the key ranges stored by each MDHIM range server 430. Following the store of keys into the exemplary partitioned key-value store 100 of FIG. 1, the application 110 can call a collective mdhim_flush( ) operation that triggers the clients 120 to send flush commands to the servers 430. In this manner, the MDHIM clients 120 obtain metadata about the ranges, such as the number of stored keys in each range and the minimum and maximum key in each range. See, for example, United States Patent Application entitled "Partitioned Key-Value Store With One-Sided Communications for Secondary Global Key Lookup by Range-Knowledgeable Clients," referenced above. The exemplary flush( ) command use MPI global collective operations that are optimized in HPC for HPC networks. The return of the range statistics by the MDHIM range servers 130 is also collective.

The range-knowledgeable client 420 knows the keys in the range of 0-2 are stored by the first MDHIM server 430-1 and sends the get batch request to the appropriate server 430-1 during a second step, as follows:
　get_batch(keys from 0 to 2)

In this manner, multiple requests are aggregated into "batches" to send fewer messages over the network.

Without a global sort, even if the application knows that it wants a sorted batch of keys, the MDHIM client must break this into multiple small individual requests to a large number of servers. The global sort provided by the present invention allows the single requests from the application 410 to the client 420 to become a single request over the network between one client 420 and one server 430-1.

Figure 5:
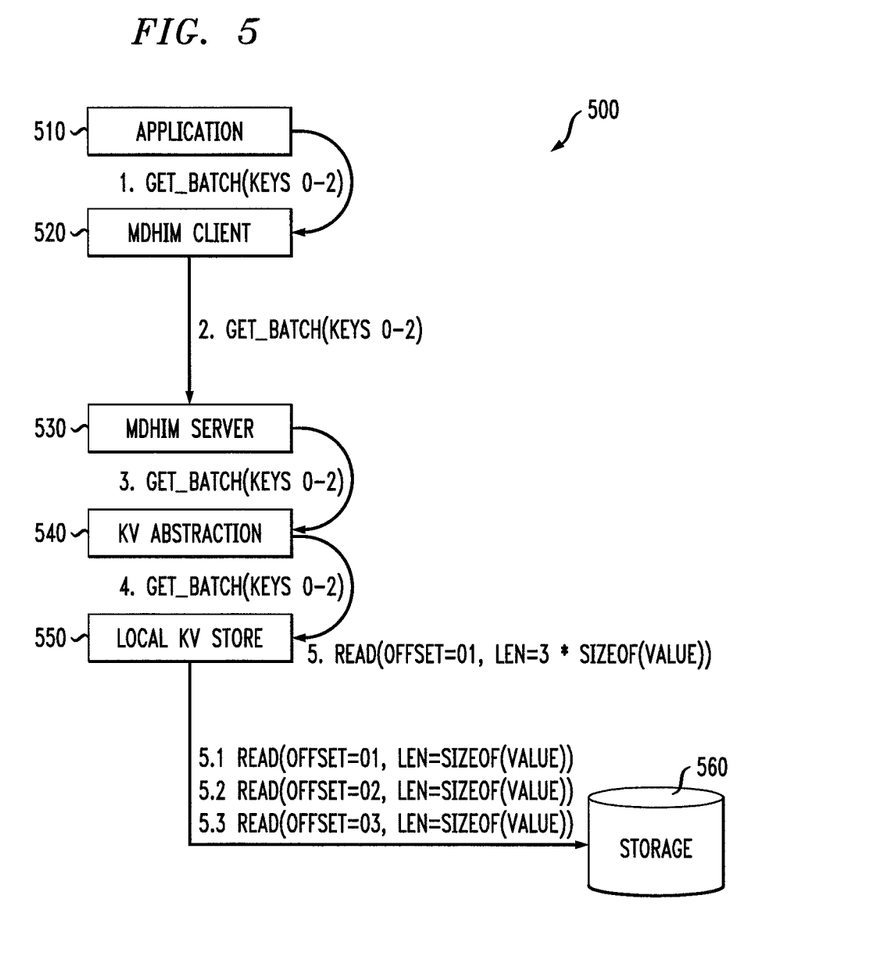
FIG. 5 illustrates the processing of another batch operation in an exemplary partitioned key-value store incorporating local sorting aspects of the invention.

FIG. 5 illustrates the processing of another batch operation in an exemplary partitioned key-value store 500 incorporating local sorting aspects of the invention. As shown in FIG. 5, the exemplary partitioned key-value store 500 comprises an exemplary application 510 that can read, write and/or query key-value data in the exemplary partitioned key-value store 500, using one or more MDHIM clients, such as the exemplary MDHIM client 520. One or more MDHIM servers, such as MDHIM server 530, control the storage of key-value data.

The exemplary application 510 initially issues an aggregated "get batch" request to the client 520 during a first step, as follows:
　get_batch(keys from 0 to 2)

The range-knowledgeable client 520 knows the keys in the range of 0-2 are stored by the MDHIM server 530 and sends the get batch request to the appropriate server 530 during a second step, as follows:
　get_batch(keys from 0 to 2)

The range-knowledgeable client 520 employs a key-value abstraction 540 and a local key-value store 550 to access the key-value data. The MDHIM server 530 stores the logical table but physically the local key-value store 550 is storing the data for this logical table on a storage device 560, such as a disk. According to one aspect of the invention, the local key-value stores 550 are internally sorted so that the local KV store 550 will issue fewer requests to the storage device 560. When the local key-value store 550 does not store sorted key-values, the following requests are issued during step 5:
　5.1. read(offset=01, len=sizeof(value))
　5.2. read(offset=02, len=sizeof(value))
　5.3. read(offset=03, len=sizeof(value))

Thus, there are 3 random reads to the actual storage device 560 with conventional techniques.

When a sorted local key-value store 550 is used in accordance with the present invention, only the following single request is issued during step 5:

5. read(offset=01, len=3*sizeof(value))

Figure 6:
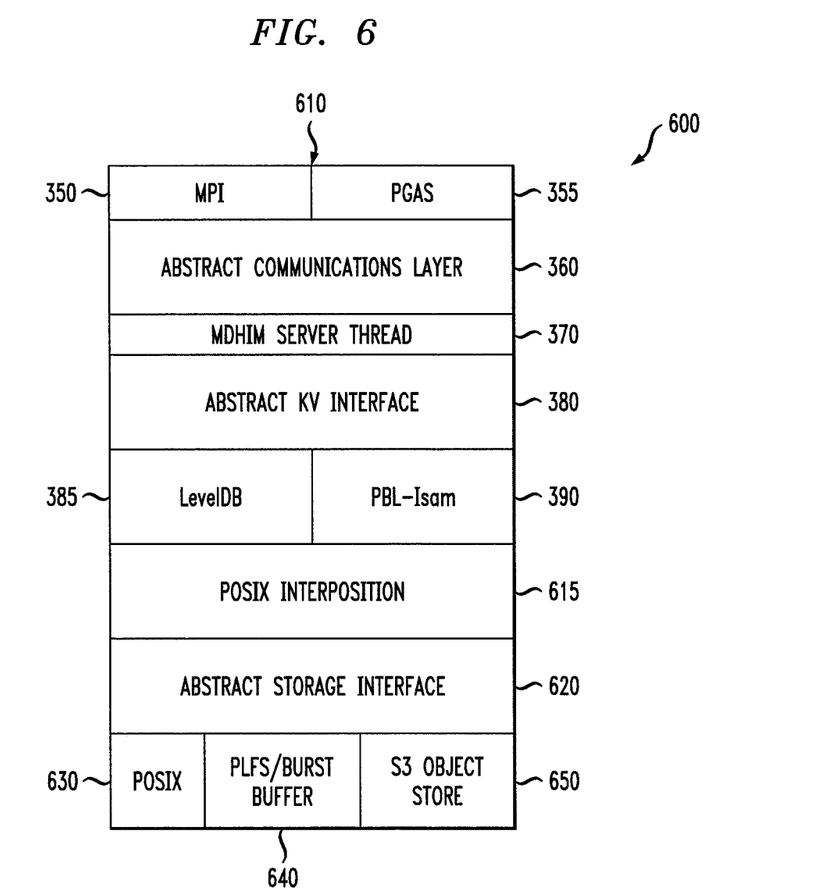
FIG. 6 illustrates the MDHIM layers for processing communications from other processes making calls in accordance with a storage architecture interface aspect of the invention.

FIG. 6 illustrates the MDHIM layers 600 for processing communications 610 from other processes making calls in accordance with a storage architecture interface aspect of the invention. As discussed above in conjunction with FIG. 3, MDHIM spawns a listener thread to receive MDHIM communications 610 from other processes making calls to mdhim such as mdhim_get or mdhim_put. MDHIM communications 610 from other processes are processed in a first layer comprising the Message Passing Interface (MPI) 350 or PGAS 355, followed by an abstract communications layer 360, MDHIM Server Thread 370, abstract key-value interface 380 and key-value operations such as leveldb 385 and Pbl-Isam 390, in a similar manner to FIG. 3.

A Portable Operating System Interface (POSIX) is a family of IEEE standards for maintaining compatibility between operating systems. POSIX defines the application programming interface (API), along with command line shells and utility interfaces, for software compatibility with variants of Unix and other operating systems. Thus, a POSIX interposition 615 layer is provided below key-value operations such as leveldb 385 and Pbl-Isam 390, followed by an abstract storage interface 620. The abstract storage interface 620 allows the existing framework to run in a variety of environments such as POSIX 630, and to leverage additional storage architectures, such as PLFS/Burst Buffer 640 and emerging object stores, such as S3 Object Store 650. The abstract storage interface 620 performs the necessary conversions/translations to leverage a burst buffer and object stores.

In this manner, one or more servers in the disclosed partitioned key-value store provide an interface between one or more local key-value stores and one or more additional storage architectures. In addition, one or more servers in the disclosed partitioned key-value store optionally provide a key value interface that provides access to at least one hardware key-value store.

Figure 7:
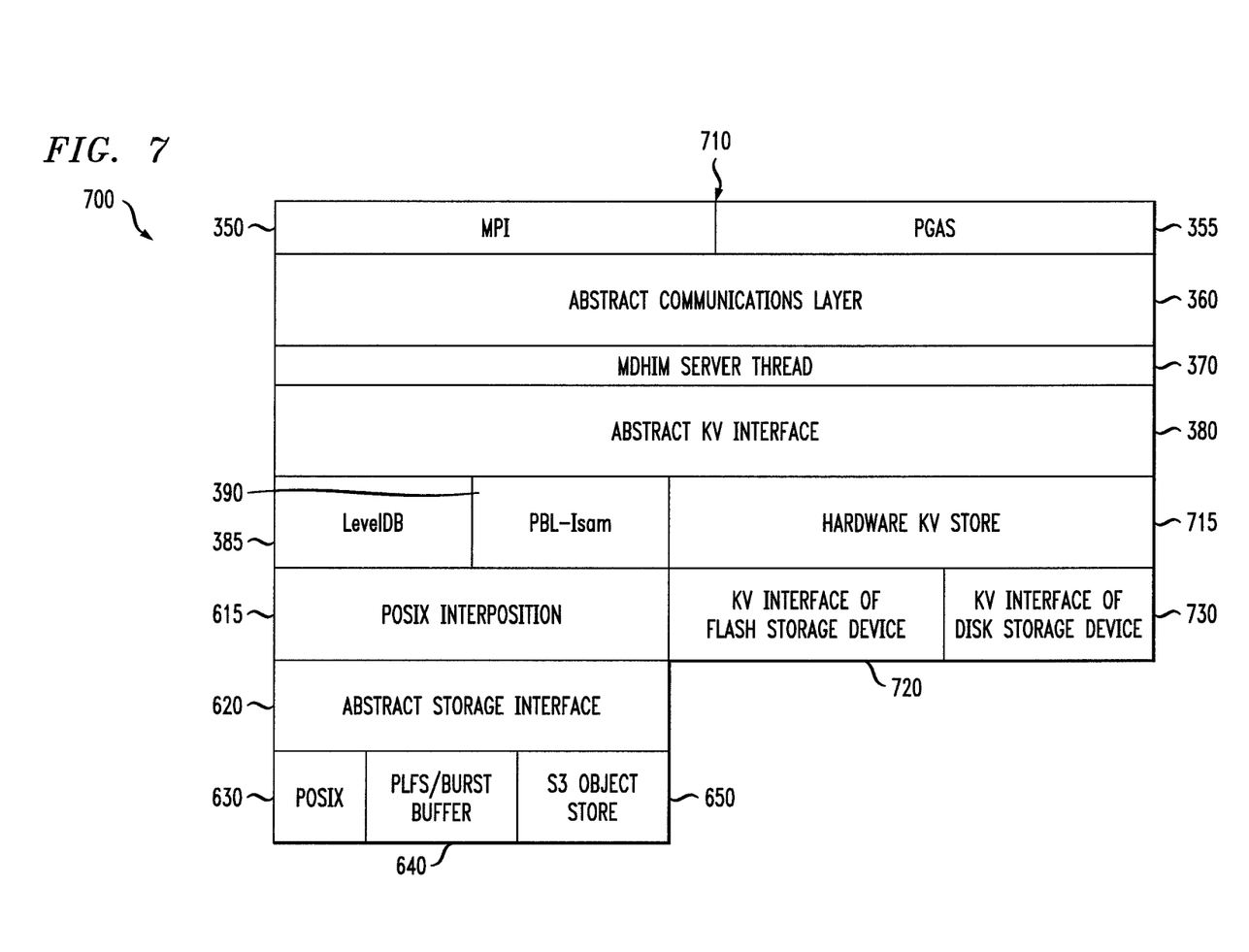
FIG. 7 illustrates the MDHIM layers for processing communications 710 from other processes making calls in accordance with a hardware key-value store interface aspect of the invention.

FIG. 7 illustrates the MDHIM layers 700 for processing communications 710 from other processes making calls in accordance with a hardware key-value store interface aspect of the invention. As discussed above in conjunction with FIG. 3, MDHIM spawns a listener thread to receive MDHIM communications 348 from other processes making calls to mdhim such as mdhim_get or mdhim_put. MDHIM communications 348 from other processes are processed in a first layer comprising the Message Passing Interface (MPI) 350 or PGAS 355, followed by an abstract communications layer 360, MDHIM Server Thread 370, abstract key-value interface 380 and key-value operations such as leveldb 385 and Pbl-Isam 390, in a similar manner to FIG. 3.

In addition, a POSIX interposition 615 layer is provided below key-value operations such as leveldb 385 and Pbl-Isam 390, followed by an abstract storage interface 620. The abstract storage interface 620 allows the existing framework to run in a variety of environments such as POSIX 630, and to leverage additional storage architectures, such as PLFS/Burst Buffer 640 and emerging object stores, such as S3 Object Store 650, in a similar manner to FIG. 6.

The Abstract KV Interface 380 also provides an interface to a hardware key-value Store 715, connected to a key-value interface 720 of a flash storage device and/or a key-value interface 730 of a disk storage device.

It is to be appreciated that the particular operations and associated messaging illustrated herein are exemplary only, and numerous other types of operations and messaging may be used in other embodiments.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the partitioned key-value stores of the present invention. Such components can communicate with other elements of the partitioned key-value store over any type of network or other communication media.

As indicated previously, components of a partitioned key-value store 100 and burst buffer appliance 190 as disclosed herein can be implemented at least in part in the form of one or more software programs stored in memory and executed by a processor of a processing device. A memory having such program code embodied therein is an example of what is more generally referred to herein as a "computer program product."

The partitioned key-value store 100, burst buffer appliance 190 or portions thereof may be implemented using one or more processing platforms each comprising a plurality of processing devices. Each such processing device may comprise processor, memory and/or network interface components.

As indicated above, multi-tier storage of key-value data such as that described herein can be implemented at least in part in the form of one or more software programs stored in memory and executed by a processor of a processing device such as a computer or server. A memory or other storage device having such program code embodied therein is an example of what is more generally referred to herein as a "computer program product." Certain system components are implemented using a combination of software and hardware.

It should again be emphasized that the above-described embodiments of the invention are presented for purposes of illustration only. Many variations and other alternative embodiments may be used. For example, the disclosed techniques are applicable to a wide variety of other types and arrangements of partitioned key-value stores and associated clients, servers and other processing devices that can benefit from the secondary global key look-up functionality as described herein. Also, the particular configurations of system and device elements shown in FIGS. 1 and 2 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A distributed storage system for storing a partitioned key-value store, comprising:
   a first storage tier comprising persistent storage of a first persistent storage type;
   a second storage tier comprising persistent storage of a second persistent storage type different than the first persistent storage type, wherein the first storage tier comprises a high-speed memory having a substantially lower access time than the second storage tier;
   a plurality of partitioned key-value store servers that store a corresponding plurality of partitions of the partitioned key-value store on one or more of said first storage tier and said second storage tier; and a burst buffer appliance comprising a high-speed memory having a substantially lower access time than the second storage tier and software to access said first storage tier and said second storage tier, wherein said first storage tier is one or more of part of said burst buffer appliance and external to said burst buffer appliance, wherein the burst buffer appliance communicates with at least one compute node over a network, wherein the burst buffer appliance is coupled between the at least one compute node and the partitioned key-value store maintained on one or more of said first storage tier and said second storage tier, the software of the burst buffer appliance processes one or more tiering commands to store key-value data of the partitioned key-value store on said first and second storage tiers comprising respective disjoint subsets of storage, wherein said partitioned key-value store comprises the plurality of partitions stored by the corresponding plurality of the partitioned key-value store servers, wherein each partition comprises a distinct range of keys, and wherein a range-knowledgeable client executing in said distributed storage system obtains range information from said corresponding plurality of partitioned key-value store servers in response to a global command, wherein said range information indicates that a given partitioned key-value store server stores a given one of said distinct range of keys, and wherein said range-knowledgeable client sends one or more requests for key-value data within said given distinct range of keys directly to said given partitioned key-value store server.

2. The distributed storage system of claim 1, wherein said burst buffer appliance processes said one or more tiering commands from said given partitioned key-value store server on a given compute node of the at least one compute node in said distributed storage system.

3. The distributed storage system of claim 1, wherein said burst buffer appliance processes one or more of read and write commands from a local key value store on a given compute node of the at least one compute node in said distributed storage system.

4. The distributed storage system of claim 1, wherein said burst buffer appliance comprises a partitioned key-value store server.

5. The distributed storage system of claim 1 wherein the burst buffer appliance communicates with a plurality of partitioned key-value store clients over a network and to process requests from said plurality of partitioned key-value store clients.

6. The distributed storage system of claim 1, wherein each partitioned key-value store server stores a globally sorted range of keys in said partitioned key-value store.

7. The distributed storage system of claim 6, wherein each partitioned key-value store server stores a locally sorted range of keys.

8. The distributed storage system of claim 1, wherein at least one partitioned key-value store server provides an interface between one or more local key-value stores and one of a plurality of additional storage architectures.

9. The distributed storage system of claim 8, wherein said plurality of additional storage architectures comprise one or more of a burst buffer appliance, a Simple Storage Service (S3) object store and a Portable Operating System Interface (POSIX).

10. The distributed storage system of claim 1, wherein at least one partitioned key-value store server provides a key value interface that provides access to at least one hardware key-value store.

11. The distributed storage system of claim 1, wherein at least one partitioned key-value store server processes one or more batch operations on one or more sorted ranges of said partitioned key-value store.

12. A method comprising:
communicating, by a burst buffer appliance in a distributed storage system, with a plurality of compute nodes over a network, a first storage tier comprising persistent storage of a first persistent storage type, and a second storage tier comprising persistent storage of a second persistent storage type different than the first persistent storage type, wherein the first storage tier comprises a high-speed memory having a substantially lower access time than the second storage tier;

storing a plurality of partitions of a partitioned key-value store on one or more of said first storage tier and said second storage tier using a corresponding plurality of partitioned key-value store servers; and processing, by the burst buffer appliance, one or more tiering commands to store key-value data of the partitioned key-value store on said first and second storage tiers comprising respective disjoint subsets of storage, the burst buffer appliance comprising a high-speed memory having a substantially lower access time than the second storage tier and software to access said first storage tier and said second storage tier, wherein the burst buffer appliance is coupled between the plurality of compute nodes and the partitioned key-value store maintained on one or more of said first storage tier and said second storage tier, wherein said partitioned key-value store comprises the plurality of partitions stored by the corresponding plurality of partitioned key-value store servers, wherein each partition comprises a distinct range of keys, and wherein a range-knowledgeable client executing in said distributed storage system obtains range information from said corresponding plurality of partitioned key-value store servers in response to a global command, wherein said range information indicates that a given partitioned key-value store server stores a given one of said distinct range of keys, and wherein said range-knowledgeable client sends one or more requests for key-value data within said given distinct range of keys directly to said given partitioned key-value store server.

13. The method of claim 12, further comprising said burst buffer appliance processing said one or more tiering commands from said given partitioned key-value store server on a compute node in said distributed storage system.

14. The method of claim 12, further comprising said burst buffer appliance processing one or more of read and write commands from a local key value store on a compute node in said distributed storage system.

15. The method of claim 12, wherein said burst buffer appliance comprises a partitioned key-value store server.

16. The method of claim 12, wherein the plurality of partitioned key-value store servers store a globally sorted range of keys in a respective partitioned key-value store.

17. The method of claim 16, wherein the plurality of partitioned key-value store servers store a locally sorted range of keys.

18. The method of claim 12, wherein at least one of the plurality of partitioned key-value store servers provides an interface between one or more local key-value stores and one of a plurality of additional storage architectures.

19. The method of claim 18, wherein said plurality of additional storage architectures comprise one or more of a burst buffer appliance, a Simple Storage Service (S3) object store and a Portable Operating System Interface (POSIX).

20. The method of claim 12, wherein at least one of the plurality of partitioned key-value store servers provides a key value interface that provides access to at least one hardware key-value store.

21. The method of claim 12, wherein at least one of the plurality of partitioned key-value store servers processes one or more batch operations on one or more sorted ranges of said partitioned key-value store.

22. A partitioned key-value store comprising:
a first storage tier comprising persistent storage of a first persistent storage type;
a second storage tier comprising persistent storage of a second persistent storage type different than the first persistent storage type, wherein the first storage tier comprises a high-speed memory having a substantially lower access time than the second storage tier; and
a burst buffer appliance comprising a high-speed memory having a substantially lower access time than the second storage tier and software to access said first storage tier and said second storage tier; and
a plurality of partitioned key-value store servers coupled to the burst buffer appliance via a network, wherein the plurality of partitioned key-value store servers store a corresponding plurality of partitions of the partitioned key-value store on one or more of said first storage tier and said second storage tier;
wherein the burst buffer appliance communicates with at least one compute node over the network, wherein the burst buffer appliance is coupled between the at least one compute node and the partitioned key-value store maintained on one or more of said first storage tier and said second storage tier,
the software of the burst buffer appliance processes one or more tiering commands to store key-value data of the partitioned key-value store on said first and second storage tiers comprising respective disjoint subsets of storage,
wherein said partitioned key-value store comprises the plurality of partitions stored by the corresponding plurality of the partitioned key-value store servers, wherein each partition comprises a distinct range of keys, and wherein a range-knowledgeable client of said partitioned key-value store obtains range information from said corresponding plurality of partitioned key-value store servers in response to a global command, wherein said range information indicates that a given partitioned key-value store server stores a given one of said distinct range of keys, and wherein said range-knowledgeable client sends one or more requests for key-value data within said given distinct range of keys directly to said given partitioned key-value store server.

23. The distributed storage system of claim 1, wherein the high speed memory of said burst buffer appliance comprises the first storage tier.

24. The distributed storage system of claim 1, wherein the high speed memory of said burst buffer appliance is used to access the first storage tier and the second storage tier.

* * * * *